F. H. SCHULENBERG.
TIRE ARMOR.
APPLICATION FILED SEPT. 11, 1909.
968,086.
Patented Aug. 23, 1910.
2 SHEETS—SHEET 1.
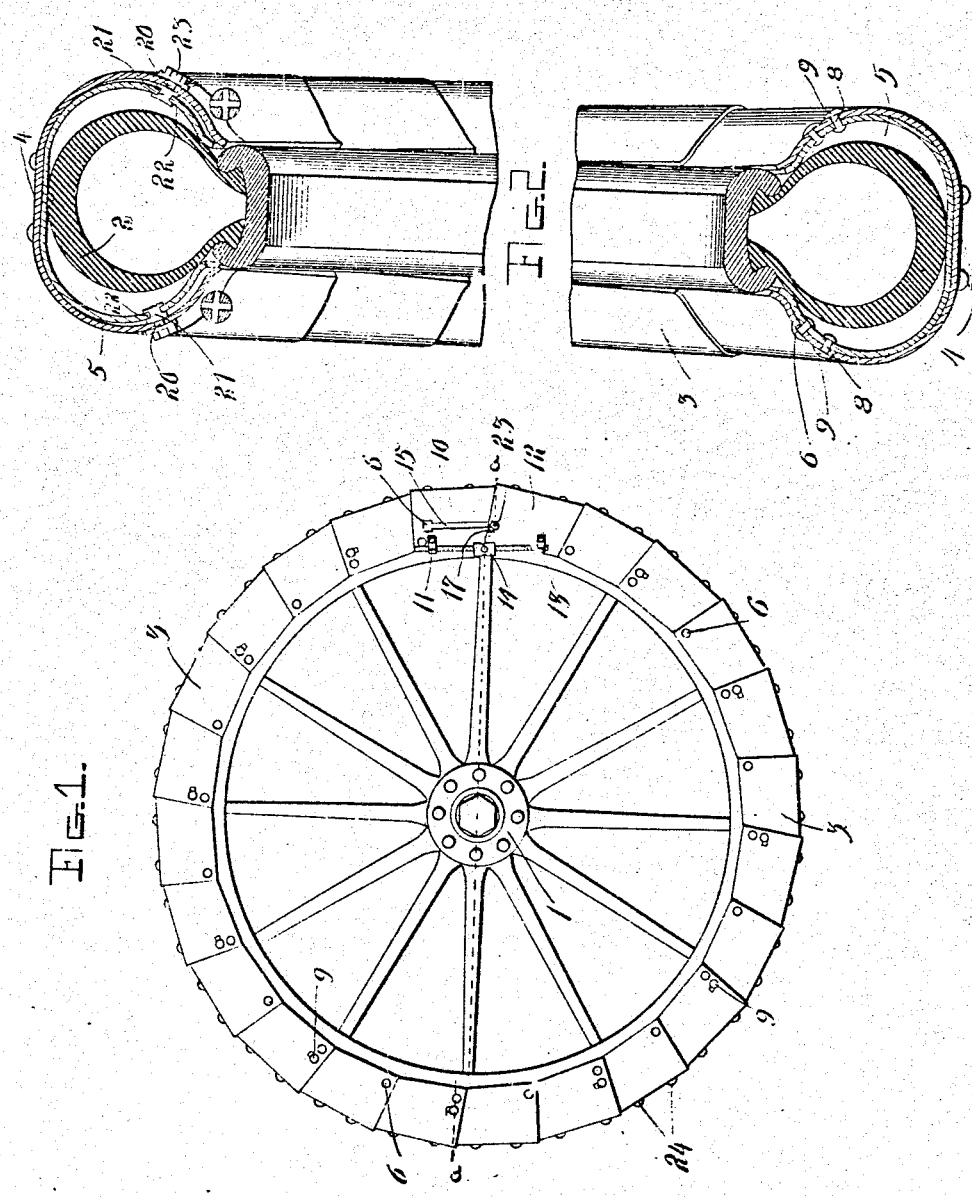

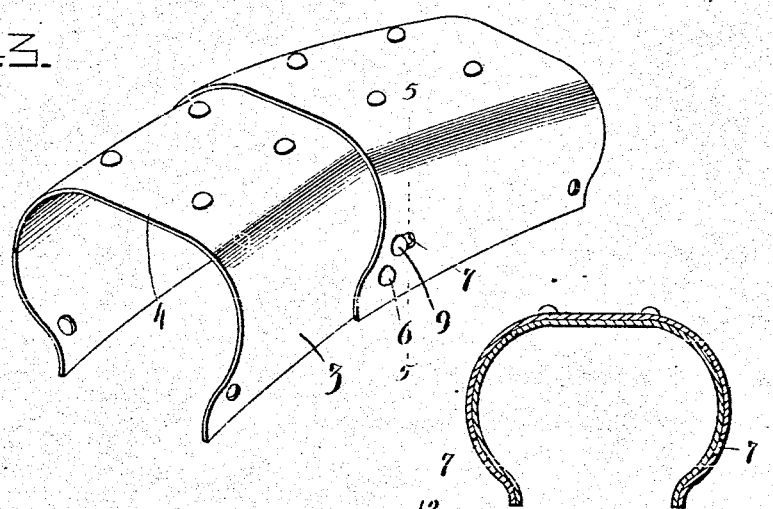
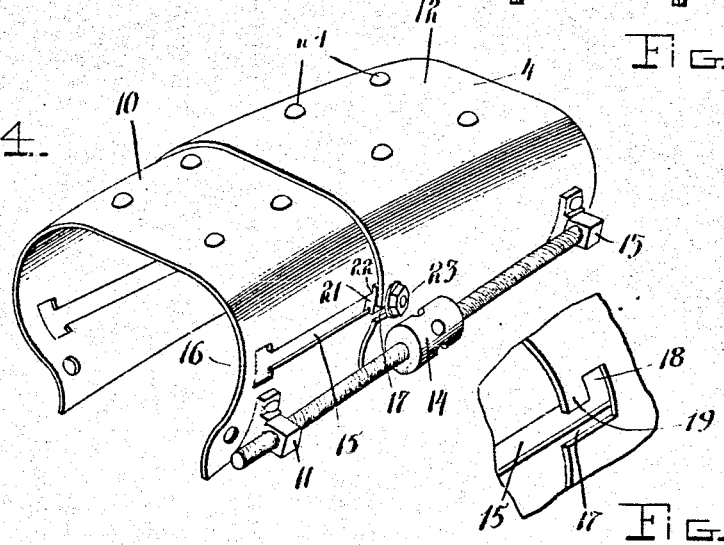

UNITED STATES PATENT OFFICE.

FRITZ H. SCHULENBERG, OF DUNKIRK, NEW YORK.

TIRE-ARMOR.

968,086.  Specification of Letters Patent.  Patented Aug. 23, 1910.

Application filed September 11, 1909. Serial No. 517,541.

*To all whom it may concern:*

Be it known that I, FRITZ H. SCHULENBERG, a citizen of the United States, residing at Dunkirk, in the county of Chautauqua, State of New York, have invented certain new and useful Improvements in Tire-Armor; and I do hereby declare the following to be a full, clear, and exact description of the invention, such as will enable others skilled in the art to which it appertains to make and use the same.

This invention is an improved tire armor, comprising a plurality of over-lapping sections connected together for relative angular movement, to make the said armor flexible, the objects of the invention being to effect improvements in the construction of the said sections, in the means for connecting them together and in the means for adjustably coupling the end sections together, to enable the armor to be placed and adjusted on the tire and to be removed therefrom at will.

With the above and other objects in view the invention consists in the details of construction and in the arrangement and combination of parts to be hereinafter more fully described and particularly pointed out in the claims.

In describing the invention in detail reference will be had to the accompanying drawings, which illustrate one embodiment of same, and in which like characters of reference denote corresponding parts in the several views.

Figure 1 is a side elevation of a vehicle wheel having a pneumatic tire with the invention applied thereto; Fig. 2, a vertical section on the line *a—a* of Fig. 1; Fig. 3, a detail view of two adjacent shield sections of the armor showing the manner in which they are connected together; and, Fig. 4, a detail view showing the manner of connecting the terminal shield sections together to secure the entire armor on the tire; Fig. 5 is a section on the line 5—5 of Fig. 3; and, Fig. 6 is a fragmental perspective view showing the arrangement of the slots in the respective terminal sections of the armor.

Referring to the drawings, 1 represents a vehicle wheel shod with a pneumatic tire 2 on which is arranged an armor constructed in accordance with this invention for preventing skidding, slipping and puncturing of the tire. Said armor comprises a plurality of shield sections 3, which have their cross sectional contour such that their tread portion is flattened as at 4 so that same contacts with the tread of the tire only at its center; and their sides curved outwardly to such an extent that a space 5 is left between the side of the tire and the sides of the shield section. The free ends of said shields are then bent up inwardly toward each other for engagement with the base of the tire, whereby the armor is held against detachment in correct position. The shield sections are connected together by the pivot pins 6 and are so arranged that the edge of one section over-laps the edge of the adjacent section and by reason of the pivotal connection just mentioned the sections are capable of movement on said pivot with respect to each other. In order to limit the movement of said sections with relation to each other slots 7 are provided in each side of the outer overlapping end of one section and laterally projecting studs 8 are secured on each side of the inclosed end of the adjacent section and extend through the respective slots 7, being retained against displacement out of said slot by the enlarged head 9 formed on the end of each of said studs. It will thus be obvious that by the construction just described the degree of movement of said sections on their pivotal connections will be limited by engagement of the stud 8 with the end wall of the slot 7.

The armor is connected together and adjusted on the tire in the following manner. The terminal shield section 10 has a threaded lug 11 projecting laterally therefrom while the terminal shield section 12 has a similar threaded lug 13 correspondingly mounted thereon. A turn-buckle having an enlarged central portion 14 and oppositely threaded portions located respectively on each side of said enlarged portion serves to connect said terminal sections by reason of the threaded engagement between its ends and the lugs 11 and 13; a rotation of the turn-buckle in one direction serving to draw the terminal sections together and a rotation in the opposite direction moving said terminal sections away from each other.

To more effectually secure the terminal sections 10 and 12 together and to relieve the turn-buckle from any undue strain the terminal section 10 is provided with a longitudinal slot 15 having one end enlarged to form a squared portion 16. The terminal section 12 is also provided with a horizontal longitudinal slot 17 which passes through the edge thereof adjacent the terminal section 12 and terminates inwardly in the vertical slot 18 so as to form the projection 19 located between said vertical slot 18 and the over-lapping end of the section. A bolt formed with a threaded shank 20 and having one end thereof enlarged to produce a squared head 21 having two of its opposite faces slotted as at 22 is adapted to bind the terminal sections together by inserting the squared head of said bolt in the enlarged square portion of the slot 15 so that the projecting edges of the narrow portion of said slot register with the slots in the opposite faces of the head of said bolt. The bolt is then moved longitudinally of the terminal section 10 in the slot 15 and at the same time the slot 17 of the section 12 is brought into alinement with the slot 15 and the bolt is then in turn moved through the slot 17 and the position of the terminal section 12 shifted so that said bolt will be brought to the upper end of the vertical slot 18 and confined against lateral movement in the slot 15 by the projection 19. A nut 23 is then screwed on the threaded shank of the bolt and the terminal sections thus positively secured together against detachment and the turn-buckle relieved of any possibility of being subjected to an undue strain.

The tread portion of the armor is provided with the projections 24 for causing the armor to more effectually grip the road-bed.

I claim:—

1. A tire armor comprising a plurality of over-lapping sections connected together for relative angular movement, one of said end sections having longitudinal slots, extending to one end thereof and transverse slots at the inner ends of and communicating with said longitudinal slots, the other end member having outwardly projecting bolts movable longitudinally with respect thereto and for engagement with the said transverse slots of the first-named end member, the said longitudinal slots of said first-named end member permitting said bolts to be engaged with and disengaged from said transverse slots and adjusting coupling means also connecting said end members together.

2. A tire armor comprising a plurality of over-lapping sections connected together for relative angular movement, one of said end sections having longitudinal slots, extending to one end thereof and transverse slots at the inner ends of and communicating with said longitudinal slots, the other end member having outwardly projecting bolts movable longitudinally with respect thereto and for engagement with the said transverse slots of the first-named end member, the said longitudinal slots of said first-named end member permitting said bolts to be engaged with and disengaged from said transverse slots, and turn-buckle couplings also connecting said end sections together.

3. A tire armor comprising a plurality of over-lapping sections connected together for relative angular movement, one of the end sections having longitudinal slots extending to one end thereof and transverse slots communicating with said longitudinal slots, the other end member having longitudinal slots, each including a widened portion, bolts projecting outwardly from the last-named end member and having heads provided with grooves receiving the sides of said slots thereof and adapting said bolts for movement longitudinally of said slots, said bolts engaging the transverse slots of the first-named end member, the said longitudinal slots of said first-named member permitting said bolts to be engaged with and disengaged from said transverse slots.

In testimony whereof, I affix my signature, in presence of two witnesses.

FRITZ H. SCHULENBERG.

Witnesses:
M. T. MILLER,
GEO. H. CHANDLEE.